United States Patent
Costes et al.

(10) Patent No.: US 8,102,075 B2
(45) Date of Patent: Jan. 24, 2012

(54) TRACK SHORT-CIRCUIT AND CURRENT RETURN DEVICE FOR A RAIL VEHICLE

(75) Inventors: Cyril Costes, Le Creusot (FR); Alain Rodet, Chalon sur Saone (FR); Yves Longueville, Torcy (FR)

(73) Assignee: Alstom Transport SA, Levallois-Perret (FR)

( * ) Notice: Subject to any disclaimer, the term of this patent is extended or adjusted under 35 U.S.C. 154(b) by 666 days.

(21) Appl. No.: 12/287,745

(22) Filed: Oct. 14, 2008

(65) Prior Publication Data
US 2009/0115249 A1 May 7, 2009

(30) Foreign Application Priority Data

Oct. 15, 2007 (FR) ...................................... 07 58311

(51) Int. Cl.
*B61F 15/28* (2006.01)
*B61L 1/18* (2006.01)
*B60L 1/00* (2006.01)
(52) U.S. Cl. .......... 307/9.1; 307/145; 307/147; 307/149
(58) Field of Classification Search ................... 307/9.1, 307/100, 145, 147, 149; 361/216, 217
See application file for complete search history.

(56) References Cited

U.S. PATENT DOCUMENTS

| | | | | |
|---|---|---|---|---|
| 4,287,551 A | * | 9/1981 | Watanabe | ..................... 361/212 |
| 5,946,180 A | | 8/1999 | Simpson | |
| 2005/0184856 A1 | | 8/2005 | Pourchot | |
| 2006/0072271 A1 | | 4/2006 | Jones et al. | |
| 2009/0115249 A1 | * | 5/2009 | Costes et al. | ................... 307/9.1 |

FOREIGN PATENT DOCUMENTS

| | | | |
|---|---|---|---|
| CA | 2 499 803 | | 4/2004 |
| DE | 19642065 A1 | * | 4/1998 |
| DE | 102 44 304 B3 | | 3/2004 |
| EP | 2052941 A1 | * | 4/2009 |
| FR | 860 539 A | | 1/1941 |
| FR | 2922177 A1 | * | 4/2009 |
| GB | 1 231 547 A | | 5/1971 |
| JP | 10194124 A | * | 7/1998 |
| JP | 2003146211 A | * | 5/2003 |
| JP | 2005 59730 | | 3/2005 |

OTHER PUBLICATIONS

Machine Translations for the Japanese Patent Documents.*

* cited by examiner

*Primary Examiner* — Fritz M Fleming
(74) *Attorney, Agent, or Firm* — Davidson, Davidson & Kappel, LLC

(57) ABSTRACT

A rail vehicle of the type comprising including at least one equipped axle which is provided with a transmission shaft which is movable in terms of rotation and which is fixedly joined in terms of rotation to two wheels, each of which is provided with a tire, the device including an electric current supply source, the source supplying a friction assembly with electric current. The friction assembly is alone and is electrically connected to a cable assembly which electrically connects the tires of the two wheels, the cable assembly including a cable portion which extends inside the transmission shaft between the two wheels.

10 Claims, 1 Drawing Sheet

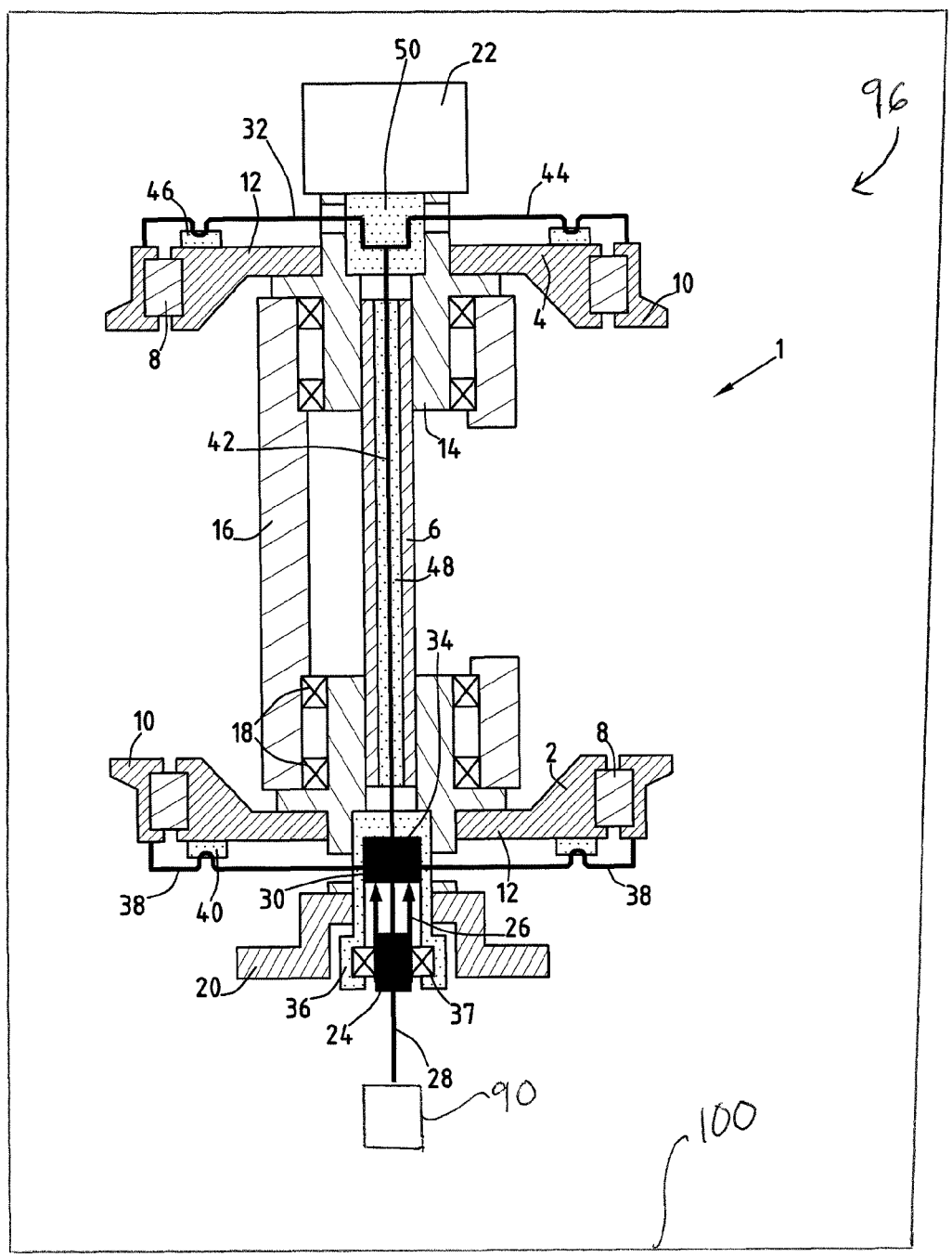

TRACK SHORT-CIRCUIT AND CURRENT RETURN DEVICE FOR A RAIL VEHICLE

This claims the benefit of French Patent Application No. 07 58311, filed on Oct. 15, 2007 and hereby incorporated by reference herein.

FIELD OF THE INVENTION

The present invention relates to a track short-circuit and current return device for a rail vehicle of the type comprising at least one equipped axle which is provided with a transmission shaft which is movable in terms of rotation and which is fixedly joined in terms of rotation to two wheels, each of which is provided with a tire, the device comprising an electric current supply source, the source supplying a friction assembly with electric current.

The invention also relates to a rail vehicle comprising such a short-circuit device.

BACKGROUND OF THE INVENTION

A short-circuit device between the wheels of a rail vehicle is used in trains in order to ensure a short-circuit between the rails of a railway track on which the vehicle runs in order to control signalling on the railway track.

Short-circuit devices of the type described above are known and such a device is provided for each wheel in order to ensure the short-circuit between the rails. In this manner, there are provided two independent devices, each of which is connected to a wheel.

A current return device is used in rail vehicles in order to establish a well-defined path for the passage of the current from the electrical power supply equipment of the train to the rails. The term "well-defined path" is intended to refer to a continuous electrical connection allowing the metal structures which are sensitive to the passage of current, such as, for example, the roller bearings of axle boxes, to be avoided and safeguarded.

According to various constructions, the wheels rotate independently of each other or are connected by an axle which fixes them to each other in terms of rotation.

In the case of independent wheels, the current return path extends from one wheel to the other via the hub thereof and via a shaft casing, inside which the hubs are mounted so as to rotate. Such a construction poses a given number of problems because the short-circuit is not really controlled and the current is not isolated from the structure of the rail vehicle.

In the case of wheels connected by an axle, the current return passes through the axle. In that case, too, the current is not isolated from the structure of the rail vehicle. Document JP-2005-59730 describes, for example, such a construction.

In the two instances described above, the resistance between the two wheel tires can further constitute instability over time. For questions of security, this resistance must be maintained at a value less than 10 mΩ.

Finally, the fact of providing two devices which are each provided with a friction member increases the number of components and the risks of malfunction, for example, owing to breakage, wear or contamination of the friction members. This also increases the value of the resistance which is mainly attributable to the friction members.

One of the objects of the invention is to overcome those disadvantages by providing a short-circuit device of the above-described type, in which the stability and maintenance of the resistance at a value less than a threshold value are ensured and in which the risks of malfunction are limited because the short-circuit is brought about without passing via friction members.

SUMMARY OF THE INVENTION

The present invention provides a short-circuit and current return device of the above-mentioned type, wherein the friction assembly is alone and is electrically connected to a cable assembly which electrically connects the tires of the two wheels, the cable assembly comprising a cable portion which extends inside the shaft between the two wheels.

According to other features of the short-circuit and current return device:

- the friction assembly may comprise friction members and a friction disc which rubs against the friction members, the friction assembly may be fixedly joined to a conductor element which is electrically connected to the cable assembly;
- the friction members or the friction disc may be fixed in position and the friction disc or the friction members may be fixedly joined to the transmission shaft in terms of rotation, respectively;
- the friction assembly and the conductor element may be arranged in the hub of one of the two wheels;
- the hub of the wheel may comprise an insulating material which is arranged against the wall of the hub and which surrounds the friction assembly and the conductor element;
- an insulating material may be arranged in the hub of the other wheel and surrounds a cable assembly portion which extends through the hub;
- an insulating material may be arranged inside the transmission shaft and surrounds the cable portion which extends through it;
- the current return may pass via a cable which supplies the friction assembly with electrical power, then via the friction assembly, then via the cable assembly;
- the electrical power supply source may be the electrical power supply equipment of the rail vehicle.

The invention also provides a rail vehicle comprising at least one bogie which is provided with an axle which is movable in terms of rotation and which is fixedly joined in terms of rotation to two wheels, each of which is provided with a tire, and comprising a short-circuit and current return device as described above, the device electrically connecting the tires of the two wheels.

BRIEF DESCRIPTION OF THE DRAWINGS

Other aspects and advantages of the invention will be appreciated from the following description which is given by way of example and with reference to the appended FIGURE, which is a schematic section of an equipped axle comprising two wheels which are connected by a transmission shaft.

DETAILED DESCRIPTION OF THE PREFERRED EMBODIMENT

With reference to the FIGURE, there is illustrated an equipped axle 1 which is provided with two wheels 2, 4 which are fixedly joined to each other in terms of rotation by means of a transmission shaft 6.

The wheels 2 and 4 have a resilient tire, that is to say that they comprise a resilient element 8 which separates the tire 10 of the wheels 2 and 4 from the main body 12 of those wheels.

Each wheel 2, 4 comprises a hub 14 which has a central hole around the axis of rotation of the wheel. Each of the extreme portions of the shaft 6 is introduced into a hub 14 in order to fixedly join the wheels to each other in terms of rotation.

The hubs 14 are arranged so as to rotate inside a casing 16 by means of roller bearings 18.

A brake disc 20 is associated with a wheel 2, and a gearbox 22 is associated with the other wheel 4. The brake disc 20 is provided with a central hole which is concentric with respect to the central hole of the hub 14 of the wheel 2.

The short-circuit and current return device used in the equipped axle 1 described above will now be described.

The device is supplied with electric current by means of an electric current supply source which is, for example, the electrical power supply equipment 90 of the rail vehicle 100, shown schematically. The current is conveyed by a supply cable assembly 28 and passes via a support 24 as far as friction members 26 which are carried by the support 24 and which are arranged in the hub 14 of the wheel 2. To that end, the electrical power supply cable assembly 28 and the support 24 which convey the current from the electrical power supply equipment as far as the friction members 26 extend into the hole of the brake disc 20 and open in the hole of the hub 14. The electrical power supply cable assembly 28, the support 24 and the friction members 26 are fixed, that is to say that they are not moved in rotation with the hub 14, as will be described below.

The friction members 26 are arranged opposite a friction disc 30 which is arranged in the hole of the hub 14 and which is fixedly joined thereto in terms of rotation. The friction disc 30 ensures contact with the friction members 26 in order to transfer the electric current to the remainder of the cable assembly 32 of the short-circuit device by means of a conductor element 34 which is fixedly joined to the friction disc 30.

The friction members 26, the friction disc 30 and the conductor element 34 are surrounded by an insulating material 36 which is arranged against the wall of the hub 14. The insulating material 36 extends in the hole of the hub 14 and in the hole of the brake disc 20 in order to isolate the hub 14 and the brake disc 20 from the short-circuit device.

The support 24 is surrounded by roller bearings 37 in order to allow the hub 14 to rotate about the support 24 and the friction members 26 without moving them in rotation.

According to one embodiment, the positions of the friction disc 30 and the friction members 26 are transposed. The friction members 26 are then moved in rotation with the hub 14 whilst the friction disc 30 is fixed in position.

All of the cable assembly 32, the friction disc 30 and the conductor element 34 are themselves moved in rotation with the wheels 2 and 4 and the transmission shaft 6.

The cable assembly 32 comprises a plurality of cable portions 38 which extend from the conductor element 34 to the tire 10 of the wheel 2. To that end, openings are formed in the hub 14 in order to allow the cable portions 38 to pass. The cable portions 38 can each extend via a runner 40 of insulating material which is arranged on the main body 12 of the wheel 2 adjacent to the resilient element 8 in order to isolate the wheel 2 from the short-circuit device. According to various embodiments, the cable assembly 32 comprises, for example, two or four cable portions 38 and a runner 40 of insulating material for each cable portion 38.

The cable assembly 32 further comprises a cable portion 42 which extends inside the shaft 6 between the two wheels 2 and 4 in order to convey the electric current as far as the wheel 4.

The cable portion 42 extends from the conductor element 34, extends through the shaft 6 and opens in the hub 14 of the wheel 4.

A plurality of cable portions 44 are electrically connected to the cable portion 42 and extend as far as the tire 10 of the wheel 4 and can each extend via a runner 46 of insulating material which is arranged on the main body 12 of the wheel 4 adjacent to the resilient element 8 in a manner similar to the cable portions 38 for the wheel 2. According to one embodiment, there are as many cable portions 44 as there are cable portions 38.

An insulating material 48 is arranged inside the axle 6 and surrounds the cable portion 42, extending through it in order to isolate the shaft from the short-circuit device.

An insulating material 50 is arranged in the hub 14 of the wheel 4 and surrounds the cable portion 42 and the cable portions 44, extending via that hub in order to isolate it from the short-circuit device.

The short-circuit device described above is therefore completely isolated from the structure of the rail vehicle, which allows complete control of the short-circuit. In particular, the short-circuit device described above ensures maintenance of the resistance between the two wheel tires 10 at a value which is stable over time and less than 10 m$\Omega$ in order to ensure the reliability of the short-circuiting. The short-circuit between the wheel tires 10 is brought about without involving the friction members 26 and 30, but instead only by means of the cable assembly 34, 38, 42 and 44. The isolation of the short-circuit device further makes the bogie 96 more reliable and the risks of malfunction are greatly reduced; in particular, the roller bearings 18 are completely protected against any passage of current.

The device uses a single friction assembly, that is to say, a friction disc 30 and friction members 26, which limits the number of components and the risks of malfunction, for example, owing to breakage, wear or contamination.

As indicated above, the short-circuit is brought about by the cable assembly 34, 38, 42 and 44.

The current return is brought about in turn by the cable 28, the friction assembly, that is to say, the support 24, the friction members 26 and the friction disc 30, then reuses the cable assembly of the short-circuit device because the friction disc 30 is in contact with the conductor element 34.

The device described above is applied at least to the front and rear axles, that is to say, the end axles, of a rail vehicle. According to various embodiments, all the axles can further be provided with such a device or only one axle per bogie can further be provided therewith.

What is claimed is:

1. A track short-circuit and current return device for a rail vehicle comprising:
    at least one equipped axle having a transmission shaft movable in terms of rotation and fixedly joined in terms of rotation to two wheels, each of the wheels having a tire; and
    an electric current supply source, the source supplying a friction assembly with electric current, wherein the friction assembly is single and is electrically connected to a cable assembly, the cable assembly electrically connecting the tires of the two wheels, the cable assembly including a cable portion extending inside the shaft between the two wheels.

2. A track short-circuit and current return device as recited in claim 1 wherein the friction assembly includes friction members and a friction disc rubbing against the friction members, the friction assembly being fixedly joined to a conductor element which is electrically connected to the cable assembly.

3. A track short-circuit and current return device as recited in claim 2 wherein the friction members are fixed in position and the friction disc is fixedly joined to the transmission shaft in terms of rotation.

4. A track short-circuit and current return device as recited in claim 2 wherein the two wheels each-include a hub, and the friction assembly and the conductor element being arranged in the hub of one of the two wheels.

5. A track short-circuit and current return device as recited in claim 4 wherein the hub of the wheel-includes an insulating material arranged against a wall of the hub and surrounding the friction assembly and the conductor element.

6. A track short-circuit and current return device as recited in claim 4 wherein the insulating material is arranged in the hub of an other of the two wheels and surrounds a portion of the cable assembly extending through the hub.

7. A track short-circuit and current return device as recited in claim 1 wherein the insulating material is arranged inside the transmission shaft and surrounds the cable portion extending through the transmission shaft.

8. A track short-circuit and current return device as recited in claim 1 wherein the current return passes via a cable supplying the friction assembly with electrical current, then via the friction assembly, then via the cable assembly.

9. A track short-circuit and current return device as recited in claim 1 wherein the electrical current supply source is an electrical power supply equipment of the rail vehicle.

10. A rail vehicle comprising:
at least one bogie provided with at least one equipped axle including a transmission shaft movable in terms of rotation and fixedly joined in terms of rotation to two wheels, each of the two wheels provided with a tire; and
an electric current supply source, the source supplying a friction assembly with electric current, wherein the friction assembly is single and is electrically connected to a cable assembly, the cable assembly electrically connecting the tires of the two wheels, the cable assembly including a cable portion extending inside the shaft between the two wheels.

* * * * *